W. SANDERSON.
HOISTING MECHANISM FOR DUMPING VEHICLES.
APPLICATION FILED OCT. 12, 1917.

1,376,732.

Patented May 3, 1921.

2 SHEETS—SHEET 1.

INVENTOR
William Sanderson
by Ray Totten & Parnell
attys

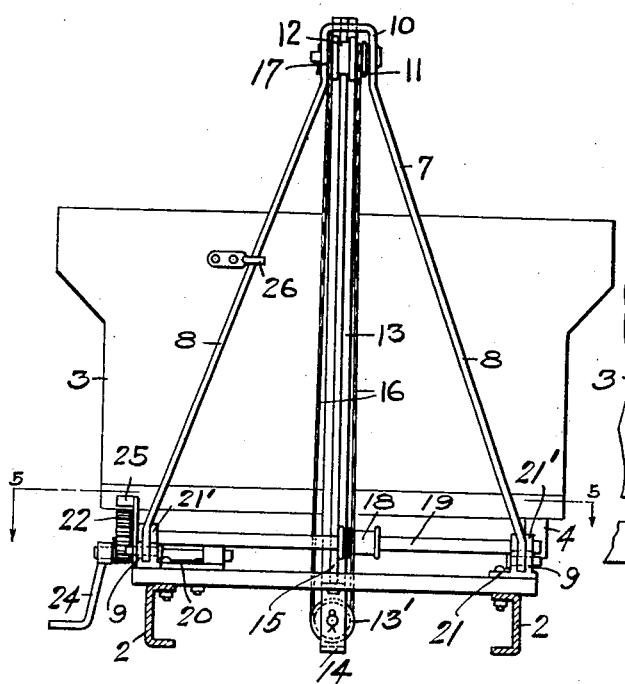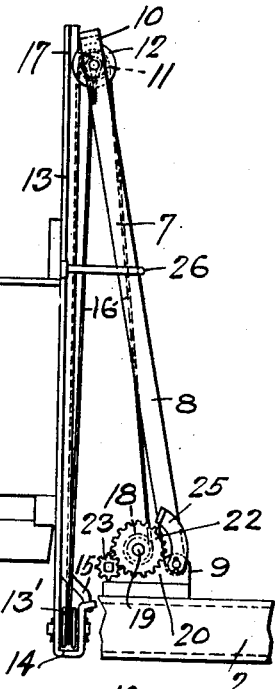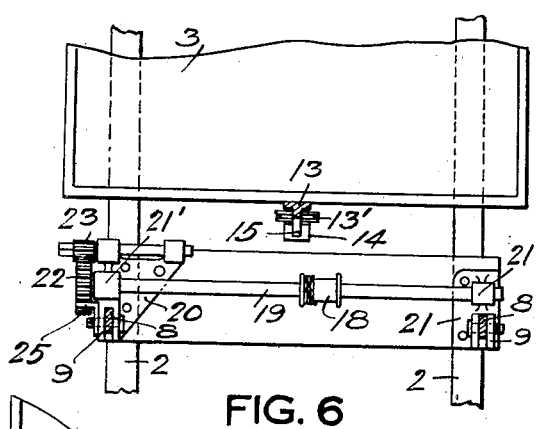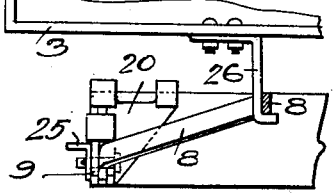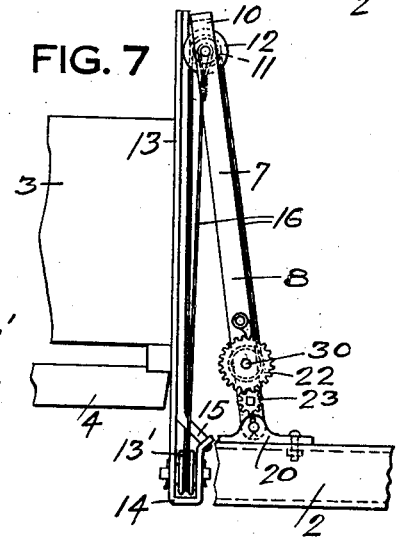

UNITED STATES PATENT OFFICE.

WILLIAM SANDERSON, OF PITTSBURGH, PENNSYLVANIA.

HOISTING MECHANISM FOR DUMPING-VEHICLES.

1,376,732.  Specification of Letters Patent.  Patented May 3, 1921.

Application filed October 12, 1917. Serial No. 196,291.

*To all whom it may concern:*

Be it known that I, WILLIAM SANDERSON, a citizen of the United States, and resident of Pittsburgh, in the county of Allegheny and State of Pennsylvania, have invented a new and useful Improvement in Hoisting Mechanism for Dumping-Vehicles; and I do hereby declare the following to be a full, clear, and exact description thereof.

My invention relates to dumping vehicles, such as truck wagons, automobile trucks, and the like,—and has particular reference to means for hoisting, for tilting the body of the vehicle so that the contents will discharge endwise of the body.

The invention is designed to provide a simple form of hoisting mechanism adapted for hand operation, and which is powerful in action, and which can be readily applied to various forms of vehicles; and a further object is to provide a device which can be operated with little labor.

Figure 1:
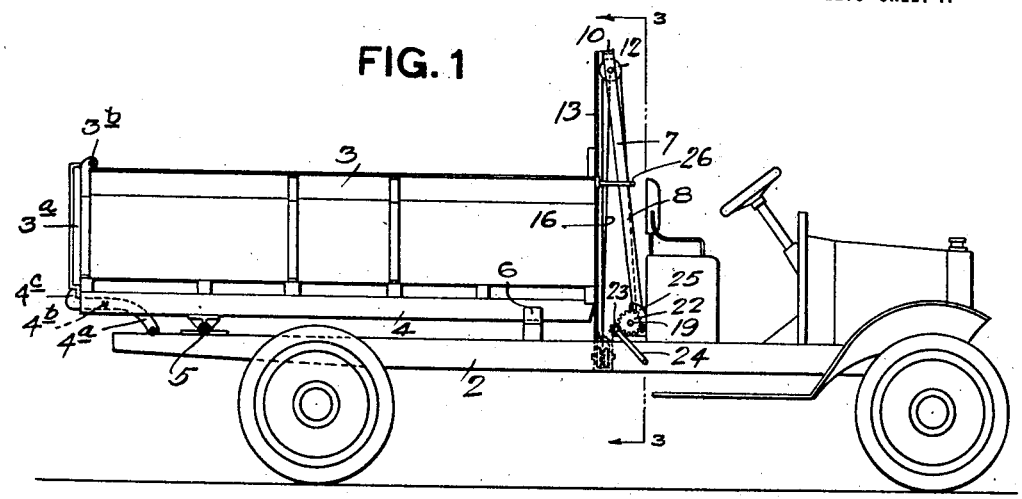
Figure 2:
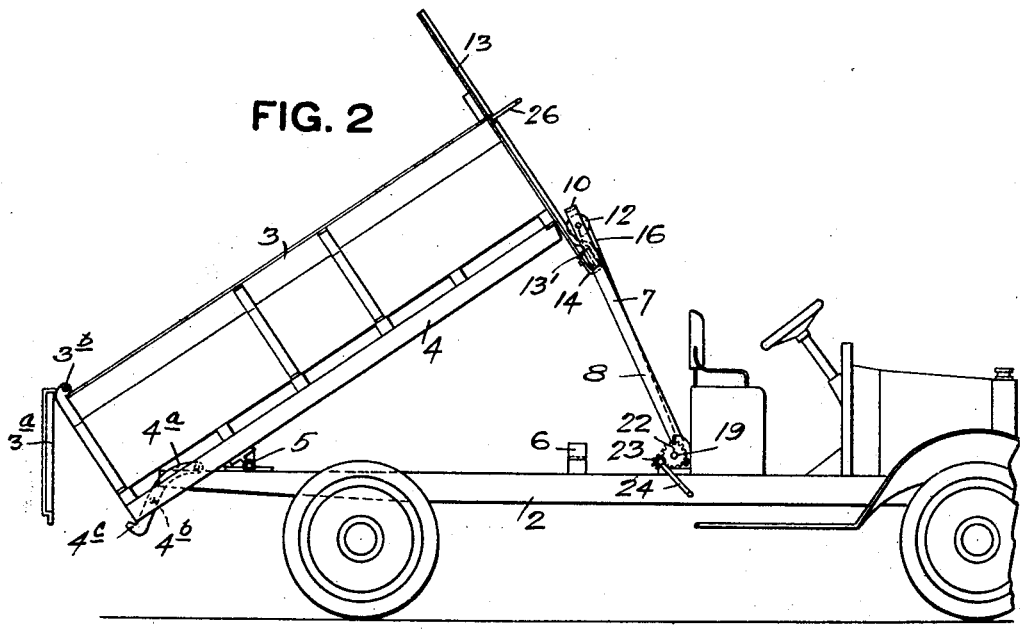

In the accompanying drawings, Figure 1 is a side elevation of an automobile truck with my improved hoisting apparatus applied thereto; Fig. 2 is a like view with the body of the vehicle in tilted or discharging position; Fig. 3 is an enlarged transverse section taken on lines 3—3, Fig. 1; Fig. 4 is a side elevational view of the hoisting mechanism; Fig. 5 is a horizontal section on the line 5—5, Fig. 3; Fig. 6 is a detail view of the arm for steadying the derrick; and Fig. 7 is a side elevation of a modified form of mechanism.

In the drawings, the numeral 2 designates a truck-frame and in the instance shown, the frame is the chassis of an automobile. Mounted upon the chassis is the body 3 of the vehicle. This body preferably is provided with an underframe 4 of suitable construction to provide for necessary clearance of the body with the chassis when the body is in tilted position. The body is hinged to the chassis at 5, any suitable pivotal connection being employed,—the connection being so disposed in respect to the center of gravity of the body as to prevent overbalancing or tilting of the body through uneven loading, or of shifting of the load. Toward the forward end of the body, the chassis is provided with a stop having upstanding guard-arms 6 for holding the body against lateral movement or side sway.

The end-board or gate $3^a$ of the body is adapted for self opening when the body of the vehicle is tilted. The gate is hinged at its upper end to the body, as at $3^b$, and is held in closed position by arms $4^a$ pivoted to the underframe at $4^b$. The arm has the upturned end $4^c$ which engages the lower edge of the gate, the opposite end of the arm being provided with a pin adapted for engagement with the top surface of the chassis or side-frame for rocking the arm on its pivot when the body is tilted,—the pivotal connection being so disposed in respect to the center of gravity of the arm as to normally hold the gate locked when the body of the vehicle is horizontal. Upon tilting of the body on its hinges, the body approaches the chassis, causing the arm to be swung on its pivot to release the door, as clearly illustrated in Figs. 1 and 2 of the drawing.

The above described structure is a preferable arrangement of body and frame, and provides for applying a dumping body to the standard auto-vehicle frame or chassis without alteration of said frame. The invention, however, is by no means limited to such structure, as it will be seen—as hereinafter described—that the hoisting or tilting mechanism is applicable to various frame and body structures.

The hoisting or tilting mechanism for swinging the body on its hinge for dumping, and for lowering the body to its normal position, comprises a derrick frame 7 mounted on the chassis in front of the body between the body and the seat of the vehicle. The frame preferably is in the form of a triangle, or V-shaped, and is formed from a single flat bar having the inclined legs 8, which are pivotally connected to bearings 9 in bearing-plates 20—21 at the sides of the chassis. The upper free end or apex of the frame is formed into a yoke 10 for the reception of a cable-sheave 11 and a guide-wheel 12.

The body of the vehicle is provided with a guide-rail 13 secured to the outer forward end of the body and in central vertical position. This rail forms in effect a third leg to the derrick against which the frame normally bears by contact with its guide wheel 12 and props the derrick in load sustaining position. The rail, preferably, is a T-rail in cross-sectional form, the central leg of the T forming a track for the flanged wheel 12, and the side flanges or head of the rail affording means for attaching the rail to the body. The rail is adapted to carry at its lower end a cable-sheave 13', around which the hoisting cable of the derrick passes to form the lifting connection between cable and body. Such form of rail provides for the formation of a strong yoke at its lower end for the reception of the cable-sheave 13'. The yoke is formed by sawing the central leg of the rail at its juncture with the head, and bending the head into a yoke 14, the severed leg portion 15 being bent outwardly and secured to the upturned portion of the yoke. In this manner, a very strong yoke is provided which is simple in structure.

A cable 16 is secured to the upper end of the derrick as at 17, and passes down and around sheave 13', and then up and around sheave 11, and then down to a cable-drum 18 secured to a wind-shaft 19, said shaft being journaled in bearings 21' of the bearing plates 20, 21 of the vehicle frame. The shaft is provided at one end with a gear-wheel 22, which is in mesh with a pinion 23 fast to a shaft journaled in the bearing plate 20, said shaft having its end projecting beyond the gear to receive an operating wrench or hand crank 24. A locking-pawl 25 is provided for locking the gears against rotation for holding the body in fixed tilted position.

The body of the vehicle is provided with an arm 26 which is adapted to engage the derrick frame when the body is in normal position, said arm engaging the inclined leg of the frame in such manner as to prevent movement of the frame away from the rail to prevent lateral vibration of the frame and displacement of the guide wheel, and to prevent rattle of parts due to vibration of the vehicle in travel.

In Fig. 7, I have shown a modified form of apparatus in which the winding-shaft 30 is journaled in the derrick frame, the windshaft and pinion shaft in this instance being in vertical alinement. In this manner of arrangement I provide for a more compact or closed-up form of structure, which may be placed in a narrower space between the seat and the body.

In the operation of the device, when it is desired to dump the contents of the vehicle, the operator simply turns the crank-handle to wind up the cable on the drum to elevate the front end of the body. Upon movement of the body on its hinge, the holding arms or latches of the end gate are caused to move on their pivots so as to release the gate, and the winding continues until the body is brought to the proper inclination for the discharge of the contents.

It will be seen that with the above-described arrangement of the winding gears great power is afforded for elevating the load, and that the work may be accomplished with but little manual labor. It will also be seen that a pawl is provided which prevents self-return of the body, the body being lowered by reverse hand-winding.

The derrick frame in the form shown provides a structure with a minimum amount of material, having great rigidity against side sway for supporting the elevated body. I do not, however, wish to limit my invention to the particular form of derrick shown, nor do I wish to limit my invention to the T-form of guide-rail for supporting the derrick, as it will be apparent these members of the structure may be varied considerably without departing from the principle of my invention. For instance, the derrick frame may be a built-up structure, and the guide-rail may be of channel form, or any other form to provide a track for the travel of the derrick guide wheel.

What I claim is:

1. In a dumping vehicle, the combination with the frame of the vehicle, of a body pivoted to the frame, and means for moving the body on its pivot to dumping position, said means comprising a derrick pivoted to the frame, and including cable winding mechanism, a rail disposed vertically on the center of the end of the body, a guide wheel on the derrick engaging said rail adapted to limit the pivotal movement of the derrick and to prevent lateral movement of the body, said rail terminating at its lower end in a yoke, a sheave in the yoke, and a cable engaging the sheave and the winding mechanism.

2. In a dumping vehicle, the combination with the vehicle frame, of a body mounted on the frame and having a T-rail vertically disposed on the end of the body, the lower end of said rail being bent to U-shape to form a sheave bearing and the T-bar portion of said rail being severed from the body and bent forward and engaging with said yoke to sustain the same.

3. In a dumping vehicle, the combination of the vehicle frame, of a body pivoted on the frame, means for moving the body to dumping position, said means including a derrick frame having legs formed integral therewith and mounted in bearings on the vehicle frame, said frame having a member at its upper end adapted to contact with the vehicle body, and a hook arm on the body adapted to hook over one of the legs of the derrick when the body is in non-dumping position.

In testimony whereof I, the said WILLIAM SANDERSON, have hereunto set my hand.

WILLIAM SANDERSON.

Witnesses:
  JOHN F. WILL,
  S. F. ARMSTRONG.